United States Patent
Barlow et al.

(10) Patent No.: US 8,949,638 B2
(45) Date of Patent: Feb. 3, 2015

(54) EMBEDDED CONTROLLER WITH AN INTERNAL TIMER

(75) Inventors: Dallas M Barlow, Houston, TX (US); Jon G Lloyd, Cypress, TX (US)

(73) Assignee: Hewlwtt-Packard Development Company, L.P., Houston, TX (US)

( * ) Notice: Subject to any disclaimer, the term of this patent is extended or adjusted under 35 U.S.C. 154(b) by 359 days.

(21) Appl. No.: 13/455,975

(22) Filed: Apr. 25, 2012

(65) Prior Publication Data

US 2013/0290757 A1   Oct. 31, 2013

(51) Int. Cl.
*G06F 1/32* (2006.01)

(52) U.S. Cl.
USPC .................. 713/320; 713/300; 713/324

(58) Field of Classification Search
None
See application file for complete search history.

(56) References Cited

U.S. PATENT DOCUMENTS

| | | | |
|---|---|---|---|
| 6,002,436 A * | 12/1999 | Anderson | 348/372 |
| 6,105,142 A | 8/2000 | Goff et al. | |
| 6,446,213 B1 | 9/2002 | Yamaki | |
| 7,797,462 B2 | 9/2010 | Falkenburg et al. | |
| 7,822,960 B2 | 10/2010 | Zimmer et al. | |
| 2007/0038874 A1 | 2/2007 | Lin et al. | |
| 2009/0063799 A1 | 3/2009 | Berenbaum et al. | |
| 2010/0174926 A1 | 7/2010 | Huang et al. | |

FOREIGN PATENT DOCUMENTS

KR   20070109110   11/2007

OTHER PUBLICATIONS

Hewlett-Packard Corp, et al., Advanced Configuration and Power Interface Specification, Revision 4.0a, Apr. 5, 2010 (pp. 485-491).

* cited by examiner

*Primary Examiner* — Paul Yanchus, III
(74) *Attorney, Agent, or Firm* — Hewlett-Packard Patent Department; Olaolu O. Adekunle

(57) ABSTRACT

Example embodiments disclosed herein relate to a computing system including a controller hub to control system sleep states, and an embedded controller including an internal timer. The embedded controller is to remove power from the controller hub when the system enters a sleep state and to enable power to the controller hub prior to the system wake time. The internal timer is to determine when to enable power to the controller hub. Example methods and machine-readable storage media are also disclosed.

18 Claims, 4 Drawing Sheets

US 8,949,638 B2

EMBEDDED CONTROLLER WITH AN INTERNAL TIMER

BACKGROUND

A computing device, such as a personal computer, laptop computer, or mobile phone, may enter a sleep state or other power-saving states to conserve power and to extend the battery life of the computing device. When the computing device enters a sleep state, power may still be provided to some components of the computing device (e.g., components to support waking up from the sleep state). Generally, the more components of the computing device that are not powered during a system sleep state, the more power may be conserved. Accordingly, manufacturers of computing devices may desire to further reduce power consumption of computing devices by removing or disabling power from one or more components of a computing device when the computing device enters a sleep state.

BRIEF DESCRIPTION OF THE DRAWINGS

The following detailed description references the drawings, wherein.

DETAILED DESCRIPTION

Figure 1:
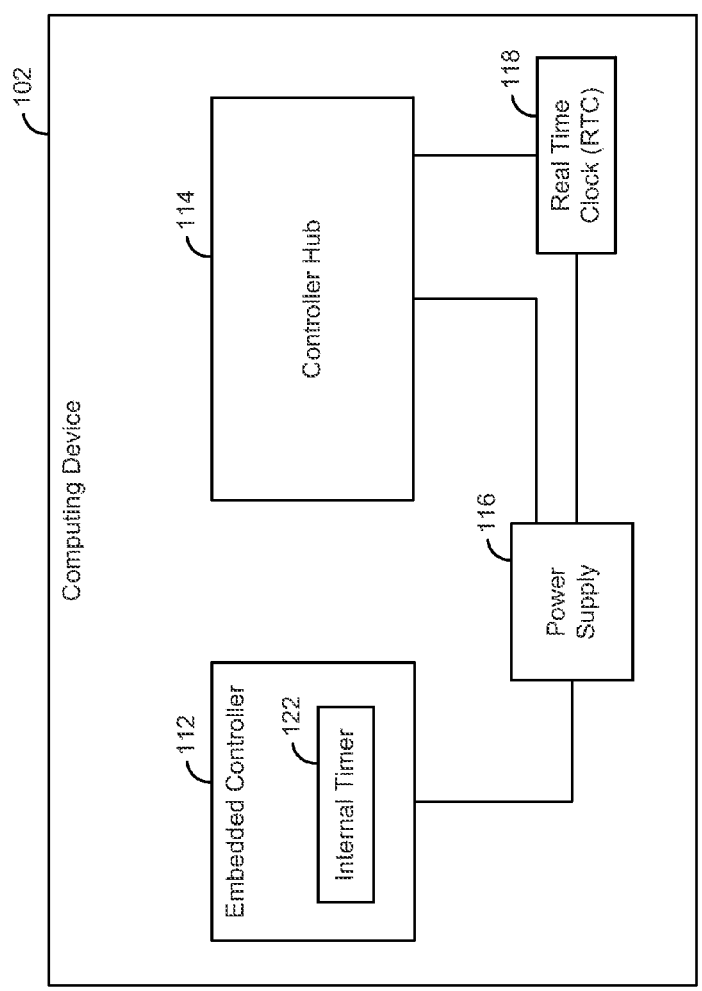
FIG. 1 is a block diagram of an example implementation of a computing device including an embedded controller for controlling power to a controller hub.

A controller hub (e.g., a chipset) of a computing device may manage sleep states of the computing device by controlling the transition of the computing device in and out of the sleep states. Further, the computing device may include a real time clock (RTC) to determine when to wake the computing device from a sleep state. The controller hub may include the RTC or the RTC may be external to the controller hub. When the computing device enters a sleep state, power may still be provided to the controller hub in order to support wake from RTC. Thus, it may be desirable to support RTC wake from sleep state in a power efficient manner.

Because the RTC wake capability is tied to the controller hub, power may not be disabled from the controller hub during a system sleep state without disabling the RTC wake capability. Thus, when the system enters a sleep state, power must be provided to the controller hub in order to support the RTC wake capability. Enabling power to the controller hub when the system has entered asleep state does not effectively reduce total system power consumption, because the controller hub may still be consuming a substantial amount of power even though the system is in a sleep state. Accordingly, as described in detail below, various examples relate to an embedded controller that includes an internal timer to control power supply to a controller hub during a system sleep state.

The embedded controller manages power supplied to the controller hub by removing power from the controller hub when the system enters a sleep state, thereby reducing the system's overall power consumption. Turning off or reducing power consumption of any component of the system (e.g., the controller hub) results in an increase in power efficiency and reduction in heat generation of the system, thereby promoting a greener environment. An internal timer of the embedded controller determines when power is to be reapplied to the controller hub. The embedded controller reapplies power to the controller hub prior to a scheduled RTC wake up time of the system. The internal timer of the embedded controller tracks a length of time (or duration of time) until power is to be reapplied to the controller hub, the length of time expiring prior to the wake up time of the system. When the length of time expires, the embedded controller reapplies power to the controller hub. Once power is reapplied to the controller hub, the controller hub may wake up the system from the sleep state. Additional embodiments and applications will become apparent to those skilled in the art upon reading and understanding the following description.

In the description that follows, reference is made to the term, "machine-readable storage medium," As used herein, the term "machine-readable storage medium" refers to any electronic, magnetic, optical, or other physical storage device that stores executable instructions or other data (e.g., a hard disk drive, random access memory, flash memory, etc.).

Referring now to the drawings, FIG. 1 is a block diagram of a computing device including an embedded controller for controlling power to a controller hub, according to one example. The computing device 102 includes, for example, an embedded controller 112, a controller hub 114, a power supply 116, and a real time clock (RTC) 118 communicatively coupled as shown. Computing device 102 may be, for example, a notebook computer, a desktop computer, a laptop computer, a handheld computing device, a mobile phone, a server, a slate or tablet computing device, a portable reading device, or any other processing device.

Embedded controller 112 may be, for example, performing auxiliary functions for the system 100, such as initialization, input/output (I/O), management, system reset functionality, thermal management operations, power management operations, and to configure and control various devices within the system 100. The embedded controller 112 may be part of a system-on-chip (SoC) that may also include various additional components that may be coupled to the embedded controller 112 (e.g., memory, keyboard, mouse, battery, mouse, etc). Further, the embedded controller 112 may be a peripheral device controller for the system 100 (e.g., a keyboard controller). Accordingly, the embedded controller 112 may perform functions such as system monitoring and control, verification of correct system operation (i.e., system health monitoring), troubleshooting and error recovery, or any combination thereof. When the system 100 is off or in a power-saving state, or operating in the background when the system 100 is active.

Controller hub 114 may be a chipset of a computing system 100 for managing or controlling the transitioning of the computing system 100 in and out of sleep states. An operating system (OS) of the computing system 100 may determine when the computing system 100 is to enter a sleep state. Alternatively, or in addition, a user may schedule, via the OS, a sleep time for the computing system 100. Once the OS determines that the computing system 100 is to enter a sleep state, a basic input/output system (BIOS), described in FIG. 2, may prepare the controller hub 114 for the sleep state. For example, the BIOS may prepare the controller hub 114 for the sleep state by initializing one or more registers of the controller hub 114 and/or save current values of the controller hub registers. When the controller hub 114 is prepared for the sleep state, the controller hub 114 controls transition of the computing system 100 into the determined sleep state. For example, controller hub 114 may control transition of the computing system 100 into at least one advanced configuration and power interface (ACPI) specification sleep state, wake the system from the ACPI sleep state, or a combination thereof. The ACPI specification sleep states may include, for example, an S3 sleep state, an S4 sleep state, and an S5 sleep state.

RTC 118 is a system clock that keeps track of current time. For example, RTC 118 may track time in days, hours, minutes, and seconds. RTC 118 may include a current time and an alarm time, the alarm time indicating a time when the system 100 is wake up from a sleep state. The RTC 118 alarm time may further indicate when the system 100 is to execute a particular task, a time the system 100 is to shut down, or a time the system 100 is to enter any other power-saving state. RTC 118 may include an alternate power supply (not shown), different from power supply 116, to accurately track current time when power supply 116 has been disabled. The alternate power supply may include a lithium battery or a supercapacitor to enable RTC 118 to keep time while a primary source of power is shut off or unavailable.

Power supply 116 provides power to the computing system 100 and components therein including controller hub 114, RTC 118, and embedded controller 112. Power supply 116 may include an alternating current (AC) power supply, a direct current (DC) power supply, or a combination thereof.

Embedded controller 112 controls power supply 116 to the controller hub 114. For example, the embedded controller 112 removes or disables power from the controller hub 114 when the system 100 enters a sleep state and enables or reapplies power to the controller hub 114 prior to the system wake up time. Embedded controller 112 includes an internal timer 122 to determine when power is to be enabled to the controller hub 114. For example, internal timer 122 may track a length of time until power is to be enabled to the controller hub 114, where the length of time occurs prior to the system wake up time. Thus, the embedded controller 112 enables power to the controller hub 114 prior to the system wake up time to allow reinitialization of the controller hub 114 by the BIOS. For example, if the current time is 1 pm and the RTC wake up time is scheduled for 1:30 pm, internal timer 122 may countdown (i.e., track) a length of time until power is to be enabled to the controller hub, where the length of time expires prior to the wake up time. For example the length of time may be a few seconds before the RTC wake up time (e.g., 25 minutes, 28 minutes, 29 minutes, or 29.5 minutes).

During operation of the system 100, for example, the OS may determine that the system 100 is to enter a sleep state (e.g., S3, S4, or S5 sleep states) and the controller hub 114 may control the transition of the system into and out of the sleep state. The RTC 118 may determine a wake up time for the system 100 (i.e., a particular time the system 100 is to wake up from the sleep state). The RTC wake up time may be indicated in hours, minutes, seconds, or any combination thereof. When the system 100 enters the sleep state, the embedded controller 112 removes power from the controller hub 114, thereby reducing overall power consumption of the system 100. The internal timer 122 of the embedded controller 112 tracks time to determine when the embedded controller 112 may enable power back to the controller hub 114. Accordingly, a representation of the RTC wake time (e.g., a length of time) is temporarily transferred to the internal timer 122 of the embedded controller 112. The length of time tracked by the internal timer 122 may expire prior to the system wake up time to provide sufficient time for reinitialization of the controller hub 114 and to provide sufficient time for the controller hub 114 to wake the system 100 from the sleep state.

The internal timer 122 may not keep current time, for example. Instead, the internal timer 122 may maintain time counts or timer ticks. For example, the internal timer 122 may track time based on a number of counts of the internal timer. To illustrate, if a count of the internal timer 122 is 30 seconds long and if the wake up time for the system 100 is scheduled for 10 minutes (i.e., 600 seconds) from a present time, the internal timer 122 may determine that power is to be reapplied to the controller hub after 19 counts or timer ticks of the internal timer 122. Thus, after 19 counts (i.e., 570 seconds), the internal timer 122 may notify the embedded controller 112 to enable power to the controller hub. The controller hub 114, now powered, may apply power to the system 100 to wake the system 100 from the sleep state.

Figure 2:
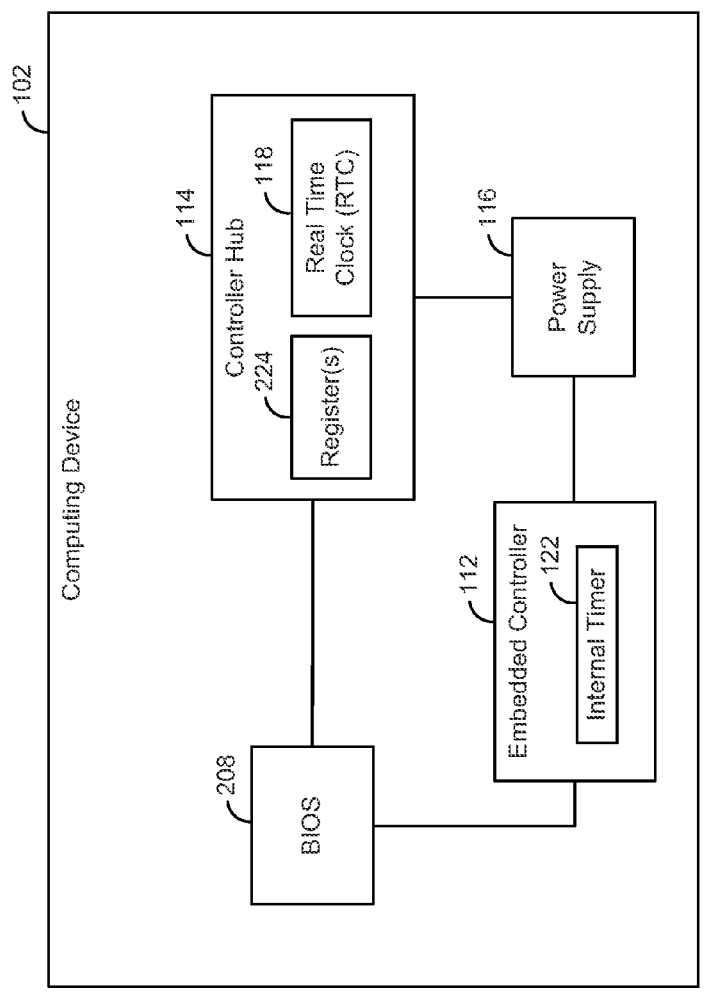
FIG. 2 is a block diagram of an example implementation of a computing device including an embedded controller and a basic input/output system (BIOS) for controlling power to a controller hub.

It should be noted that although RTC 118 is illustrated to be external to the controller hub in FIG. 1, RTC 118 may be included in the controller hub 114, as illustrated in FIG 2. The disclosed example embodiments may thus reduce both AC and DC power consumption of the system 100 by removing power from the controller hub 114 while supporting RTC 118 wake from sleep states, thereby promoting a greener environment.

FIG. 2 is a block diagram of an embodiment of a computing device including an embedded controller and a basic input/output system (BIOS) for controlling power to a controller hub. In this example, the computing device 102 of the computing system 200 includes a BIOS 208, the embedded controller 112, the controller hub 114, and the power supply 116 communicatively coupled as shown.

The BIOS 208 may be implemented as a firmware of the computing device 102. In certain scenarios, the BIOS 208 is the first code that is executed by a processor of the computing device 102 when the computing device 102 is powered on. The BIOS 208 then initializes and identifies devices associated with the computing device 102 (e.g., input/output interfaces, storage interfaces, wired/wireless network interfaces, or the like). Moreover, the BIOS 208 may be responsible for turning over control of the computing device 102 to an operating system (e.g., via a boot loader).

As described above, the embedded controller 112 may perform various system-management operations, such as power management, thermal management, configure and control system devices such as batteries, power sensors, fans, keyboard, mouse, and other ACPI communications protocols.

Further, in this example, the controller hub 114 may include one or more registers 224 for indicating whether or not an RTC wake is enabled. For example, a value '1' may indicate that the RTC wake is enabled and a value of '0' may indicate that the RTC wake is not enabled, or vice versa. In one embodiment, the RTC 118 may be included in the controller hub 114, as shown. In other embodiments, the RTC 118 may be external to the controller hub 114, as shown in FIG. 1.

During operation of the system 200, for example, the OS may determine that the system 200 is to enter a sleep state (e.g., one of the ACPI specification sleep states) to conserve power. To illustrate, a user via an OS interface may schedule a sleep time for the system 200. Alternatively, or in addition, the OS may determine that the system 200 has been idle for long period of time and may reduce power consumption by entering a power-saving sleep state. When the system 200 is to enter the sleep state, the BIOS 208 reads the at least one register 224 of the controller hub 114 to determine whether an RTC wake event is enabled. If it is determined that an RTC wake event is enabled, the BIOS 208 reads a current time and an alarm time (i.e., a wake time) from the RTC 118 register 224. Based on the current time and the alarm time, the BIOS 208 calculates an amount of time (e.g., a number of seconds) before the system 100 is to wake from the sleep state. For example, if the current time indicated by the RTC 118 is 3 pm and the alarm time indicated by the RTC 118 is 4 pm, the BIOS 208 calculates that the system 100 is to wake from the sleep state after 3600 seconds.

Based on the calculation, the BIOS 208 may further estimate a length of time until power is to be restored to the controller hub 114 (i.e., a length of time until the embedded controller 112 is to reapply power to the controller hub 114). The length of time may be estimated such that the length of time occurs prior to the wake up time, to provide sufficient time for the embedded controller 112 to reapply power to the controller hub 114 before the system wake up time. For example, the length of time may be 3595 seconds (i.e., 5 seconds prior to the system wake up time). The BIOS 208 then communicates the length of time to the embedded controller 112. The length of time may be estimated based on timer characteristic of the internal timer. For example, the length of time may be estimated based on a number of counts of the internal timer. To illustrate, if a count of the internal timer 122 is 30 seconds, the BIOS 208 may estimate the length of time to be 119 counts of the internal timer 122 (i.e., 3595/30). As another example, if a count of the internal timer 122 is 20 seconds, then the BIOS 208 may estimate the length of time to be 179 counts (i.e., 3595/20).

The BIOS 208 may also save current state information of the controller hub 114 (and registers 224). When the system 200 enters the sleep state, the embedded controller 112 removes power from the controller hub 114. Subsequently, the internal timer 122 of the embedded controller tracks the length of time (i.e., counts down). The length of time is set to expire prior to the system wake up time such that the BIOS 208 may reinitialize the controller hub 114 prior to the wake up time restoring the state information of the controller hub 114). Upon expiration of the length of time, as determined by the internal tinier 122, the embedded controller 112 reapplies power to the controller hub 114. When power is restored to the controller hub 114, the controller hub 114 may wake the system 200 from the sleep state at the scheduled system wake time. Accordingly, additional system power savings may be realized by removing power from the controller hub 114 when the system is in the sleep state. Additionally, RTC wake capability can still be supported while removing power from the controller hub 114 by monitoring system wake up time via the internal tinier 122 of the embedded controller 112.

Figure 3:
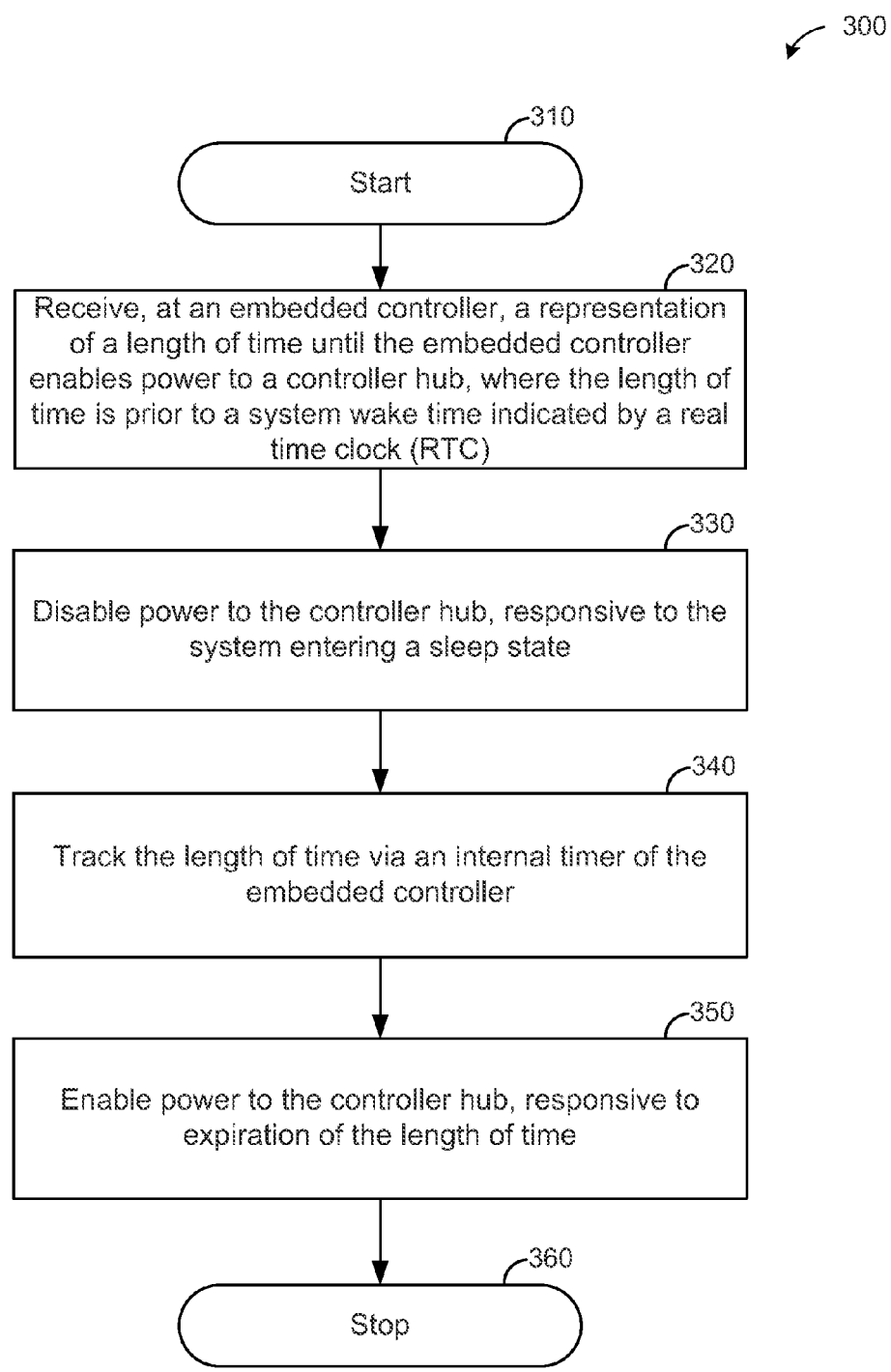
FIG. 3 is a flowchart of an example implementation of a method for controlling power to a controller hub of a computing device.

FIG. 3 is a flowchart of an embodiment of a method 300 for controlling power to a controller hub of a computing device. Although execution of method 300 is described below with reference to the components of computing device 102, other suitable components for execution of method 300 will be apparent to those of skill in the art. Additionally, the components for executing the method 300 may be spread among multiple devices. Method 300 may be implemented in the form of executable instructions stored on a machine-readable storage medium, such as machine-readable storage medium 410 of FIG. 4, and/or in the form of electronic circuitry.

Method 300 may start in block 310 and proceed to block 320. Where the embedded controller 112 may receive a representation of a length of time indicating when the embedded controller 112 is to enable power to the controller hub 114. The indication or representation of the length of time may be received from the BIOS 208, for example. The length of time may correspond to a time prior to a system wake time determined by the RTC 118 (i.e., may expire prior to the RTC system wake time). Further, the length of time may be indicated in seconds, minutes, hours, or any combination thereof. Alternately, or in addition, the length of time may be indicated based on a number of counts of the internal timer 122 of the embedded controller 112.

After receipt of the length of time, method 300 may proceed to block 330, where the embedded controller 112 may disable power to the controller hub 114, responsive to the system 100 entering a sleep state. The embedded controller 112 may disable system power supply 116 from the controller hub 14, where the power supply 116 may be an AC power, a DC power, or a combination thereof When power is disabled from the controller hub 114 during the sleep state, a reduction in overall system power consumption may be achieved and/or battery life of the system 100 may be extended.

Method 300 may then proceed to block 340, where the internal timer 122 of the embedded controller 112 may track the length of time. Next, method 300 may proceed to block 350, where the embedded controller 112 may enable power to the controller hub, responsive to expiration of the length of time. When the internal timer 122 determines that the length of time has expired, the embedded controller 112 causes power to be applied to the controller hub 114 via the power supply 116. When power is applied to the controller hub 114, the controller hub 114 may wake up the system 100 appropriately. Method 300 may then proceed to block 360, where the method 300 stops.

Figure 4:
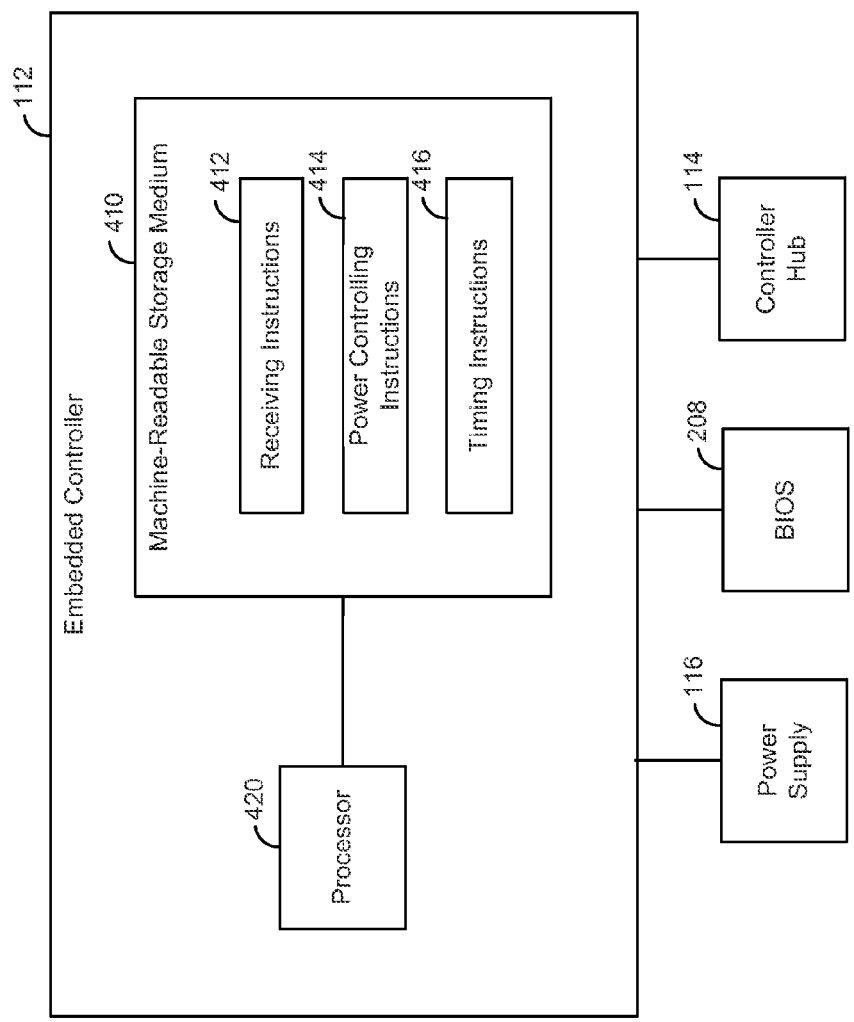
FIG. 4 is a block diagram of example implementation an embedded controller including a machine-readable storage medium encoded with instructions for controlling power to a controller hub.

FIG. 4 is a block diagram of an embedded controller including a machine-readable storage medium encoded with instructions for controlling power to a controller hub. In the embodiment of FIG. 4, embedded controller 112 includes processor 420 and machine-readable storage medium 410. Power supply 116, BIOS 208, and controller hub 114 may also be communicatively coupled to the embedded controller 112.

Processor 420 may be a micro-processor, a semiconductor-based microprocessor, other hardware devices or processing elements suitable for retrieval and execution of instructions stored in machine-readable storage medium 410, or any combination thereof. Processor 420 may fetch, decode, and execute instructions stored in machine-readable storage medium 410 to implement the functionality described in detail below. As an alternative or in addition to retrieving and executing instructions, processor 420 may include at least one integrated circuit (IC), other control logic, other electronic circuits, or any combination thereof that include a number of electronic components for performing the functionality of instructions 412, 414, and 416 stored in machine-readable storage medium 410. Further, processor 420 may include single or multiple cores on a chip, include multiple cores across multiple chips, multiple cores across multiple devices, or any combination thereof.

Machine-readable storage medium 410 may be any electronic, magnetic, optical, or other physical storage device that contains or stores executable instructions. Thus, machine-readable storage medium 410 may be, for example, NVRAM, Random Access Memory (RAM), an Electrically Erasable Programmable Read-Only Memory (EEPROM), a storage drive, a Compact Disc Read Only Memory (CD-ROM), and the like. Further, machine-readable storage medium 410 can be computer-readable as well as non-transitory. As described in detail below, machine-readable storage medium 410 may be encoded with a series of executable instructions for controlling power to a controller hub. The executable instructions may be, for example, a portion of an operating system (OS) of computing device 102 or a separate application running on top of the OS to mange power to the controller hub. Other suitable formats of the executable instructions will be apparent to those of skill in the art.

Machine-readable storage medium 410 may include receiving instructions 412, which may be configured to receive and process an indication of a length of time until the embedded controller 112 is to enable power to the controller hub 114. For example, receiving instructions 112 may be configured to receive the length of time information from the BIOS 208, the length of time indicating when the embedded controller 112 is to enable power to the controller hub 114. The length of time may be set to occur prior to a scheduled system wake time.

Machine-readable storage medium 410 may also include power controlling instructions 414, which may be configured to manage power supply 116 to the controller hub 114. Power controlling instructions 414 may be configured to remove power from the controller hub 114 when the system 100 enters a sleep state and to enable power to the controller hub 114, responsive to expiration of the length of time. Thus, power controlling instructions 414 may be configured to determine when power is to be removed from the controller hub 114 and to determine when power is to be reapplied to the controller hub 114, thereby conserving system power during sleep states.

Machine-readable storage medium 410 may further include timing instructions 416, which may be configured to track the length of time via the internal timer 122 of the embedded controller 112. The length of time may expire prior to the system wake time indicated by the RTC 118. Thus, power may be enabled to the controller hub 114 prior to the RTC system wake time.

According to the embodiments described in details above, power consumption of a computing system may be reduced by removing power from a controller hub when the computing system enters a sleep state. Further, RTC wake capability may still be supported while removing power from the controller hub by monitoring the system wake time via an internal timer. Reduction in power consumption may also promote a greener environment.

What is claimed is:

1. A computing system comprising:
   a controller hub to control system sleep states;
   a real time clock (RTC) included in the controller hub to determine system wake time; and
   an embedded controller including an internal timer, the embedded controller to:
     remove power from the controller hub when the system enters a sleep state; and
     enable power to the controller hub prior to the system wake time,
     wherein the internal timer determines when to enable power to the controller hub.

2. The computing system of claim 1, further comprising a basic input/output system (BIOS), the BIOS to:
   read at least one register of the controller hub to determine whether a wake event of the RTC is enabled;
   upon determining that the RTC wake event is enabled, estimate a length of time until the embedded controller is to restore power to the controller hub; and
   provide the length of time to the embedded controller.

3. The computing system of claim 2, wherein expiration of the length of time is prior to the system wake time.

4. The computing system of claim 3, wherein the internal timer tracks the length of time.

5. The computing system of claim 2, wherein the length of time indicates a number of internal timer counts remaining until the embedded controller enables power to the controller hub.

6. The computing system of claim 2, wherein the embedded controller removes power from the controller hub in response to the system entering the sleep state.

7. The computing system of claim 1, wherein the controller hub wakes the system from the sleep state when the system wake time occurs.

8. The computing system of claim 1, wherein the sleep state includes at least one advanced configuration and power interface (ACPI) specified sleep state.

9. The computing system of claim 8, wherein the at least one ACPI specified sleep state includes one of an S3 sleep state, an S4 sleep state, and an S5 sleep state.

10. A method comprising:
    receiving, at an embedded controller, a representation of a length of time until the embedded controller enables power to a controller hub, wherein expiration of the length of time is prior to a system wake time indicated by a real time clock (RTC) included in the controller hub;
    disabling power to the controller hub, responsive to the system entering a sleep state;
    tracking the length of time via an internal timer of the embedded controller; and
    enabling power to the controller hub, responsive to expiration of the length of time.

11. The method of claim 10, wherein the representation of the length of time corresponds to a number of counts of the internal timer.

12. The method of claim 11, wherein each count of the internal timer has a duration of thirty seconds.

13. The method of claim 10, wherein the representation of the length of time is received from a basic input/output system (BIOS).

14. The method of claim 13, wherein the representation of the length of time is derived from at least one register of the controller hub.

15. A non-transitory computer-readable medium comprising instructions that, when executed by an embedded controller, cause the embedded controller to:
    receive an indication of a length of time until the embedded controller is to enable power to a controller hub;
    remove power from the controller hub, wherein the controller hub includes a real time clock (RTC);
    track the length of time via an internal timer; and
    enable power to the controller hub responsive to expiration of the length of time.

16. The non-transitory computer-readable medium of claim 15, wherein the indication of the length of time is received from a basic input/output system (BIOS).

17. The non-transitory computer-readable medium of claim 16, wherein the length of time is indicated as a number of counts of the internal timer.

18. The non-transitory computer-readable medium of claim 15, wherein expiration of the length of time is prior to a real time clock (RTC) wake time.

* * * * *